July 10, 1956
W. R. WHARTON
2,753,812
BELT GENERATOR DRIVE
Filed Dec. 4, 1953
2 Sheets-Sheet 1
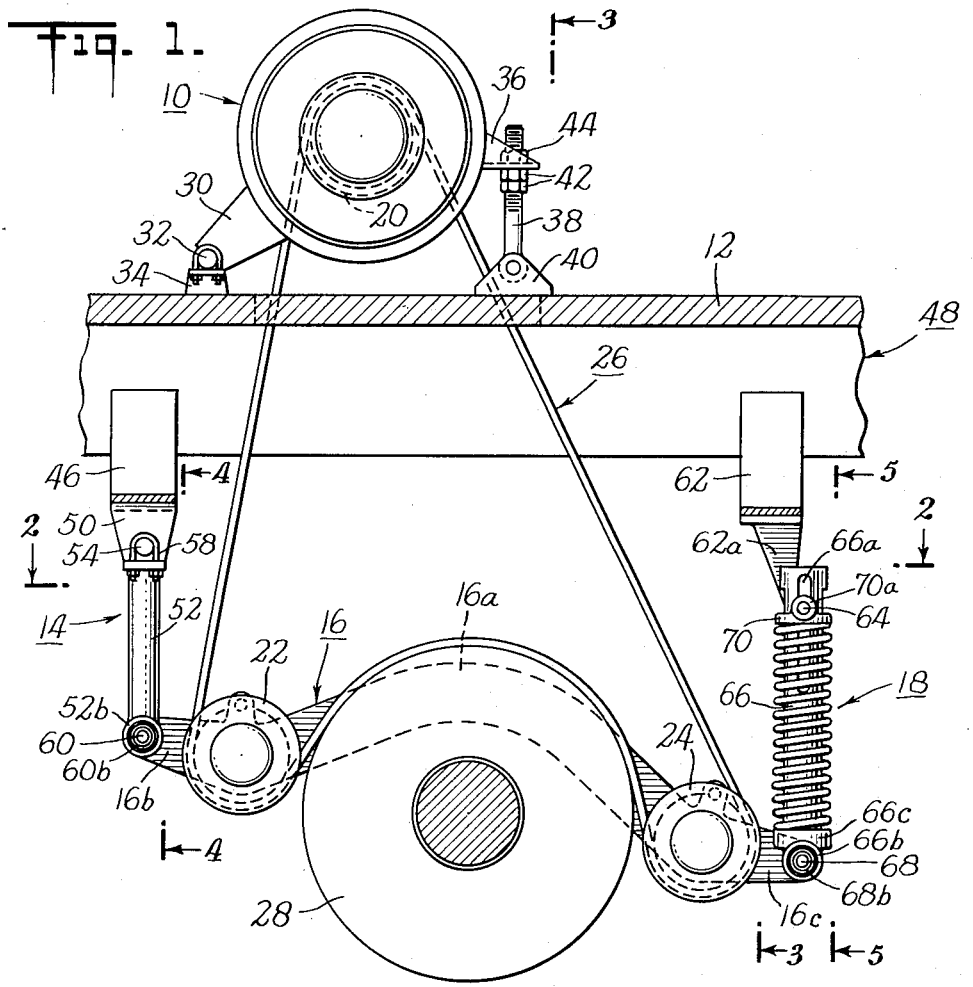
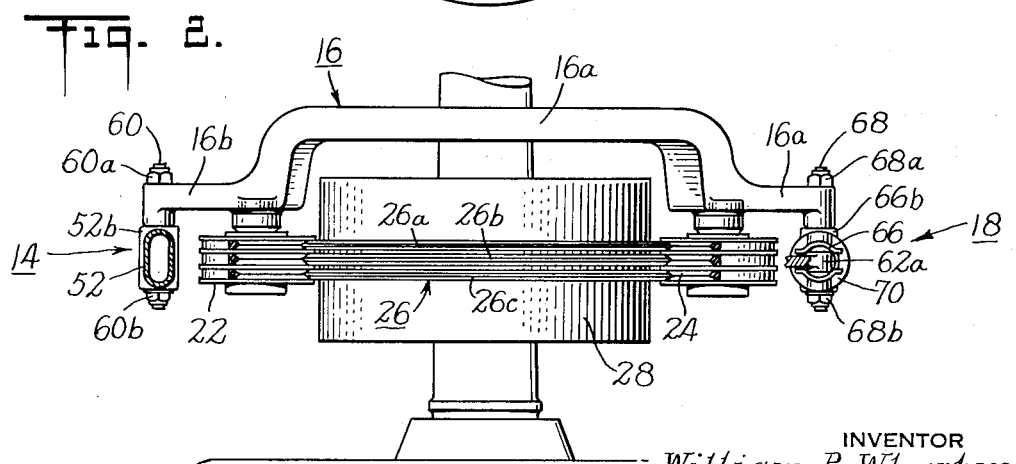
INVENTOR
William R. Wharton
BY
Watson Johnson Leavenworth + Blair
ATTORNEYS July 10, 1956  W. R. WHARTON  2,753,812
BELT GENERATOR DRIVE
Filed Dec. 4, 1953  2 Sheets-Sheet 2
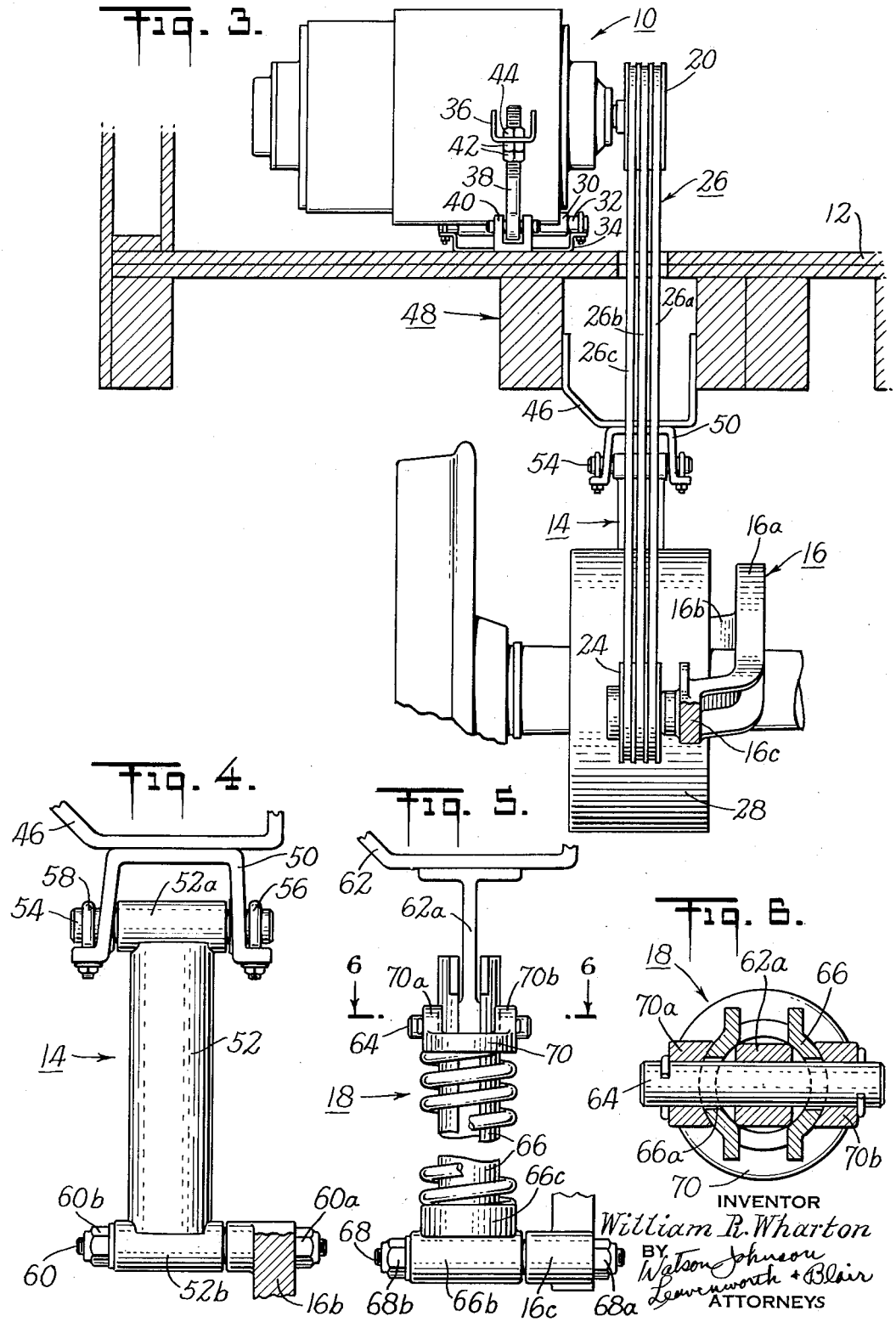
INVENTOR
William R. Wharton
BY Watson Johnson
Leavenworth & Blair
ATTORNEYS United States Patent Office 2,753,812
Patented July 10, 1956

2,753,812
BELT GENERATOR DRIVE

William R. Wharton, North Branford, Conn., assignor to The Safety Car Heating and Lighting Company, Inc., New Haven, Conn., a corporation of Delaware Application December 4, 1953, Serial No. 396,107

12 Claims. (Cl. 105—105)

This invention relates to a generator drive for a railroad car or the like and more particularly to a belt drive constructed to take power from the axle on the truck of a car.

One of the objects of this invention is to provide a belt generator drive which is simple, practical and thoroughly durable. Another object is to provide a drive of the above character wherein continuous V-belts may be utilized to advantage. Another object is to provide a generator drive of the above character in which the parts are located in a manner to be easily accessible thus making for convenient servicing. Another object is to provide a generator drive of the above character wherein the generator is located on the car floor with belt connections to a pulley on the car axle therebelow. Another object is to provide a generator of the above character in which the driving belt is supported about a substantial portion of the circumference of the axle pulley in order to achieve efficient power take-off without slippage. Other objects will be in part obvious and will in part appear hereinafter.

The invention accordingly comprises the features of construction, combinations of elements, and arrangements of parts, which will be exemplified in the construction hereinafter set forth, and the scope of the invention will be indicated in the claims.

In the accompanying drawings in which is shown one of the possible embodiments of this invention, Figure 1 is a sectional elevation of the generator drive and associated portions of a railroad car, Figure 2 is a horizontal sectional view taken along the lines 2—2 of Figure 1, Figure 3 is a sectional elevation taken along the lines 3—3 of Figure 1, Figure 4 is an enlarged sectional elevation of a portion of the drive support taken along the lines 4—4 of Figure 1, Figure 5 is an enlarged sectional elevation of another portion of the supporting mechanism taken along the lines 5—5 of Figure 1, and Figure 6 is an enlarged horizontal, sectional view taken along the lines 6—6 of Figure 5.

Similar reference characters refer to similar parts throughout the several views of the drawings.

On railroad cars carrying generators for charging storage batteries to be used for lighting and air conditioning systems or the like, it is of paramount importance not only to arrange the parts so that they may be conveniently serviced, but also to assure reliability in operation over long periods of time. It is also important to utilize endless belt drives and apparatus for replacing the belt without substantial dismantling or jacking up the car. It is also important to provide power take-off from an axle pulley or the like with an arrangement to support the driving belt around a substantial portion of the circumference of the driving pulley so that efficient power take-off without slippage is assured.

To this end, there is provided in the apparatus shown a generator generally indicated at 10 mounted on the floor 12 of the car. A post generally indicated at 14 pivotally supports a spreader bar generally indicated at 16, the other end of which is resiliently urged downwardly by a spring generally indicated at 18 in a manner to be described more fully hereinafter. Generator 10 is provided with a driving pulley 20 and idler pulleys 22 and 24 are rotatably secured to spreader bar 16 at the opposite ends thereof. Belts generally indicated at 26, preferably of the V-belt type extend over a pulley 20, beneath pulleys 22 and 24 and over the top side of an axle pulley 28 secured to the car axle in the usual manner. Thus, when the car is in motion, pulley 28 rotates and the belt 26 which is resiliently urged thereagainst takes power therefrom to rotate the generator via pulley 20.

A bracket 30 extending from the generator as seen in Figure 1 is pivotally connected to a shaft 32 secured to but spaced from the floor 12 by a support 34 (Figure 3). Thus, the generator may pivot toward and from the car axle therebelow as can be seen in Figures 1 and 3. The other side of the generator as seen in Figures 1 and 3 has a bracket piece 36 extending therefrom through which is threaded a stud bolt 38 pivoted to a support 40 on the floor 12. Ajusting nuts 42 and 44 on the opposite sides of the bracket piece 36 make it possible to adjust the position of the generator with respect to the car axle and fix its location as desired by tightening such nuts. Accordingly, the generator is supported on the car floor and yet is adjustably positioned with respect to the car axle.

A fixture 46 is secured to the car frame generally indicated at 48 as seen in Figure 3 and carries an inverted U-shaped piece 50 (Figure 4) which pivotally supports an arm 52. As best seen in Figures 1 and 4, a stud shaft 54 is supported in U-shaped piece 50 by securing elements 56 and 58 bolted thereto. A stud shaft 60 is secured to the left-hand end of spreader bar 16 as viewed in Figures 1 and 2. Stud shaft 54 extends through a collar portion 52a of arm 52 while stud shaft 60 extends through collar portion 52b of arm 52 and at the lower end thereof. Collar portion 52b of arm 52 is secured in such position by nuts 60a and 60b on stud shaft 60, suitable washers being provided as shown in detail in Figure 4. Accordingly, this end of spreader bar 16 is pivotally supported from the frame 48 of the car so that it may pivot up and down, as viewed in Figure 1, around the stud shaft 60 as an axis and may also pivot laterally about the stud shaft 54 as an axis.

The spreader bar 16 is vertically bow-shaped, as can be seen in Figures 1 and 3, having a high central portion 16a with end portions 16b and 16c depending downwardly therefrom. Thus the spreader bar may be supported above the car axle and spaced therefrom while the bottoms of the idler pulleys 22 and 24 disposed at the opposite end portions of the spreader bar are located substantially below the top side of the axle pulley 28. Further, as can be seen in Figures 2 and 3, the end portions 16b and 16c are laterally curved inwardly or toward the center line of the axle pulley 28. The central portion 16a of the spreader bar thus is laterally spaced from the axle pulley while the idler pulleys 22 and 24 are in alignment therewith. These pulleys are grooved and are here shown supporting three V-belt driving pulleys 26a, 26b and 26c (Figure 3). These belts contact a substantial portion of the periphery of the axle pulley 28 because idler pulleys 22 and 24 are substantially therebelow thus making for an efficient power take-off without slippage.

A bracket piece 62 extends downwardly from car frame 48 to support spring 18 in a manner now to be described. As seen in Figures 5 and 6, bracket piece 62 has an eye portion 62a at its lower end through which is threaded a stud shaft 64. Stud shaft 64 extends through a longitudinal slot 66a of a shank 66 (Figure 1) the lower end of which has a collar portion 66b pivotally connected to the right-hand end of spreader bar 16 as viewed in Figures 1 and 2. Now turning to Figure 5, a threaded stud shaft 68 is secured to this end of the spreader bar by nuts 68a and 68b, and the laterally spaced eye portions 70a and 70b of a cup-shaped member 70 are supported on stud shaft 64 to seat the upper end of spring 18 which is threaded on shank 66. The lower end of the spring 18 is seated in a cup-shaped part 66c of the shank 66. Accordingly, the right-hand end of the spreader bar may pivot about the stud shafts 64 and 68 and the spreader bar is urged at this end downwardly by the spring 18 which is under compression between the cup-shaped parts 70 and 66c.

It will now be apparent that the spreader bar 16 carrying the idler pulleys 22 and 24 may pivot laterally or to the right and left as viewed in Figure 1 about stud shafts 54, 64 and 68. It may also pivot vertically to move the end portion 16c thereof toward and from the car frame about the stud shaft 60 as an axis. In operation, the axle of the railroad car moves vertically in accordance with irregularities in the roadbed and such movement is compensated for by the pivoting action of the spreader bar to achieve a constant belt tensioning at all times. Also, when the car moves around curves, the axle must turn with the truck thus disposing it at an angle to the axis of the idler pulleys 22 and 24. Such action is compensated for by lateral pivoting of the spreader bar to assure a continuous contact of the belts 26a, b and c with the axle pulley 28 at all times while the car is moving.

The various parts for resiliently supporting the spreader bar and the idler pulleys in engagement with the axle pulley are conveniently located beneath the car where they may be easily serviced. The generator on the car floor is, of course, easily accessible and may be adjusted to properly tension the belts simply by adjusting the nuts 42 and 44. The apparatus is unusually simple and yet designed to effect an efficient power take-off from a car axle.

It will thus be seen that I have provided a thoroughly practical apparatus in which the several objects hereinabove referred to are successfully accomplished, and since certain changes may be made in the above construction without departing from the scope of the invention, it is intended that all matter contained in the above description or shown in the accompanying drawing shall be interpreted as illustrative and not in a limiting sense.

I claim:

1. In a railroad belt generator drive for power take-off from a car axle the combination of a generator with a belt drive pulley mounted above the car axle, an axle pulley fixed to said car axle, a spreader bar having one end pivoted to an extension from the car frame at a point below the top of said axle pulley, said spreader bar extending over and spaced above said axle to a point on the other side thereof, means resiliently urging the other end of said spreader bar downwardly toward said axle, a pair of idler pulleys rotatably mounted on said spreader bar on the opposite sides of said axle pulley, and an endless belt threaded over the generator pulley under the idler pulleys and over the axle pulley.

2. In a railroad belt generator drive for power take-off from a car axle the combination of a generator with a belt drive pulley mounted above the car axle, an axle pulley, a spreader bar, means supporting said bar so that it straddles said axles and is spaced thereabove, said means resiliently urging said bar toward said axle, a pair of idler pulleys rotatably mounted on said spreader bar on the opposite sides of said axle pulley, said spreader bar being shaped and positioned so that the bottoms of said idler pulleys are located below the top of said axle pulley and an endless belt threaded over the generator pulley under the idler pulleys and over the axle pulley.

3. The generator drive defined in claim 2 in which one end of said spreader bar is pivoted to said frame and the other end is resiliently urged toward said axle.

4. In a railroad belt generator drive for power take-off from a car axle the combination of a generator with a belt drive pulley mounted above the car axle, an axle pulley fixed to said car axle, a bow-shaped spreader bar, means supporting said spreader bar to straddle the axle with its concave side facing the axle and spaced thereabove including means resiliently urging said spreader bar toward said axle, a pair of idler pulleys rotatably mounted on the opposite ends of said spreader bar, and an endless belt extending over the generator and axle pulleys and under the idler pulleys.

5. The generator drive defined in claim 4 in which one end of said spreader bar is pivotally supported and the other end is resiliently urged toward said axle.

6. The generator drive defined in claim 4 in which the ends of the spreader bar are located below the top of said axle pulley.

7. The generator drive defined in claim 4 in which the spreader bar is axially spaced from the axle pulley and the idler pulleys are mounted on stud shafts extending toward the axle pulley with the axle pulley and the idler pulleys in substantial alignment.

8. The generator drive defined in claim 4 in which the generator is adjustably mounted on the car frame and the idler bar is pivoted at one end to a post extending downwardly from the car frame.

9. The generator drive defined in claim 4 in which the resilient means for urging the spreader bar toward the axle comprises a compression spring interposed between a fixture secured to the car frame and the end of the spreader bar.

10. The generator drive defined in claim 4 in which the resilient means for urging the spreader bar toward the car axle comprises a shank pivotally connected to the spreader bar and slidably connected to a fixture secured to the car frame with a compression spring threaded on said shank having its ends situated in cup-shaped members secured to said fixture and said end of said spreader bar.

11. In a railroad belt generator drive for power take-off from the car axle the combination of a generator with a belt drive pulley mounted on the car frame, an axle pulley, means forming a post extending downwardly from the car frame on one side of said axle, a bow-shaped spreader bar straddling said axle with end portions disposed substantially below the top surface of said pulley, idler pulleys rotatably mounted on said end portions of said spreader bar with their bottoms substantially below the top of said axle pulley, means pivotally connecting one end of said spreader bar to said post, means resiliently urging the other end of said bar toward said axle, and a belt threaded over the generator and axle pulleys and under the idler pulley.

12. The generator drive defined in claim 11 in which the generator is adjustably mounted on the car frame so that desired belt tensioning may be achieved.

References Cited in the file of this patent

UNITED STATES PATENTS

| | | |
|---|---|---|
| 564,335 | Moskowitz | July 21, 1896 |
| 1,578,700 | Anderson | Mar. 30, 1926 |